(12) United States Patent
Pan et al.

(10) Patent No.: US 9,275,144 B2
(45) Date of Patent: Mar. 1, 2016

(54) SYSTEM AND METHOD FOR METADATA SEARCH

(75) Inventors: Yue Pan, Beijing (CN); Guo Tong Xie, Xi Er Qi (CN); Ni Yuan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1859 days.

(21) Appl. No.: 12/567,213

(22) Filed: Sep. 25, 2009

(65) Prior Publication Data
US 2010/0106729 A1  Apr. 29, 2010

(30) Foreign Application Priority Data
Sep. 27, 2008 (CN) .......................... 2008 1 0149813

(51) Int. Cl.
*G06F 17/30* (2006.01)
(52) U.S. Cl.
CPC ............................... *G06F 17/30864* (2013.01)
(58) Field of Classification Search
CPC .................. G06F 14/30864; G06F 17/30867; G06F 17/3089; G06F 17/30864
USPC .......................................................... 707/707
See application file for complete search history.

(56) References Cited

U.S. PATENT DOCUMENTS

| 6,718,324 | B2 | 4/2004 | Edlund et al. |
| 7,146,362 | B2 * | 12/2006 | Allen et al. |
| 7,228,301 | B2 | 6/2007 | Meyerzon et al. |
| 2007/0130112 | A1 * | 6/2007 | Lin ................................... 707/2 |
| 2008/0263006 | A1 * | 10/2008 | Wolber et al. ..................... 707/3 |

OTHER PUBLICATIONS

David Hawking, et al., "Efficient and Flexible Search Using Text and Metadata", CSIRO Mathematical and Information Sciences, Technical Report 2000/83, May 2000.

* cited by examiner

*Primary Examiner* — Syling Yen
(74) *Attorney, Agent, or Firm* — Fleit Gibbons Gutman Bongini & Bianco PL; Thomas Grzesik

(57) ABSTRACT

A system, a method, and a computer readable article of manufacture for metadata searching. The system includes: a receiving module for receiving a search query with respect to a plurality of metadata resources; a query module for parsing the search query and searching related metadata resources and the structural information among the related metadata resources according to the parsing of the search query; and an output module for outputting the search results so as to realize a fuzzy structural search with respect to the plurality of metadata resources. The method includes the steps of: receiving a search query that does not designate complete structural information of the metadata resources; parsing the search query and searching related metadata resources to form search results that include the complete structural information; and outputting the search results.

19 Claims, 11 Drawing Sheets

Browse Glossary

Class: BusinessTerm
Part of the street address defining the house number

Status: STANDARD
Steward: Undefined

Add note
Add related term
Add synonym
Add to category
Assign steward
Classify with term
Edit
Feedback
Use to classify object

| Notes | Synonymous | Classified By | Classified Objects | Referenced by | Related Term | Attributes |

| | | |
|---|---|---|
| abbreviation | A short name used as the primary abbreviation of the Term. | String |
| alternateAbbreviation | A secondary abbreviation of the Term. | String |
| classification | NONE — Specifies the classification of a term based on its use in metadata naming standardization. The possible values are: NONE, PRIMARY, CLASS (SECONDARY) -- see definition in | UNDEFINED |
| example | Provide examples of the Term. | String |
| isQualifier | A boolean indicator as to whether or not the term's primary purpose is to provide descriptive information about an object (TRUE) or to identify distinguishing characteristics of an object | Boolean |
| isSystem | Indicates whether the object can be modified or not. | Boolean |
| longDescription | -This number can be associated with letters of litterals (A,B,Bis, Ter...). -The address number may not exist in simple geographical addresses. When there is no registered house number for this address, house numbers should be represented by either an hyphen or by a literal in usage in the country (SN in Spain, for example. -The address number | Text |
| name | AddressNumber — The name of an Object. | String |
| shortDescription | Part of the street address defining the house number — A short non-structured textual description, usually no more than 255 characters. | String |

FIG. 2    Prior Art

SYSTEM AND METHOD FOR METADATA SEARCH

CROSS REFERENCE TO RELATED APPLICATION

This application claims priority under 35 U.S.C. 119 from Chinese Patent Application 200810149813.1, filed Sep. 27, 2008, the entire contents of which is incorporated herein by reference.

BACKGROUND OF THE INVENTION

1. Field of the Invention

The present invention relates to data handling in a data processing system. More particularly, the present invention relates to a system and method for metadata searching.

2. Description of Related Art

With the development of data warehouse applications, service-oriented architecture (SOA), etc., metadata in an information system, namely, data about the data, is becoming more and more important. Especially in an enterprise scenario, various metadata are stored and managed in different repositories. For example, WebSphere Service Registry and Repository (WSRR) is a place for storing metadata information on services; WebSphere Business Glossary (WBG) manages general glossaries and classification information with respect to enterprises and IT users; and WebSphere DataStage is for developing and storing metadata of ETL jobs. The Metadata administrator and users may be overwhelmed by the large amount of metadata in the enterprise without an effective metadata search method; and it may be difficult to find the important metadata information and the users may create redundant metadata. Therefore, a metadata search engine and a metadata search method are indispensable for successful metadata management.

There are various types of metadata resources, for example, ComplexTypeDefinition in an XSD document, Service descriptions in a WSDL document, BusinessTerm definitions, BusinessCategroy definitions, and the like. Each metadata resource has some attributes, e.g., its label, and an annotation for describing it. Different metadata resources may be associated with each other. For example, a BusinessTerm may classify a Service, a BusinessCategory may contain a BusinessTerm, etc. Such association information may be considered as the structural information of the metadata.

If each metadata resource is considered as a node and the relationships among the metadata resources are considered as edges among the nodes, then the metadata resources may be linked to generate a metadata graph. In this way, the problem of the metadata search lies in finding out the relevant metadata resources in such a metadata graph. Since the number and the types of metadata are usually huge, it is very difficult for the metadata administrator and users to find the desired metadata information in the graph. FIG. 1 schematically shows various metadata resources and their complex relationships in an exemplary enterprise scenario including a design and development phase and a runtime phase.

Several tools for performing metadata search exist in the prior art. The metadata search methods adopted by these tools can be classified into the following two categories. The first category is a search engine based on keywords. The description of metadata resources can be published as HTML pages, and in this way, a current Web search engine based on keywords in the contents of HTML pages can be used to perform the metadata search. FIG. 2 shows an exemplary HTML page for a metadata resource BusinessTerm AddressNumber. IBM OmiFind Yahoo! Edition provides a crawler and a simple search engine for Web sites. The OmniFind can be configured to acquire all the HTML pages for the metadata resources, and then its search engine can be used to search the metadata.

For example, using the keywords "street address" contained in the page of FIG. 2 to perform search, the metadata resource BusinessTerm AddressNumber may be returned. Such a conventional keyword search method does not require the user to know the structure of the metadata, and hence has an advantage of simple operation. However, since it only uses small text segments in the metadata, without using the structural information within a metadata resource and the structural and semantic information among different metadata resources, it is usually insufficient to search out useful or relevant metadata information.

The second category is a search engine based on query. If the user knows the structure of the metadata, it is possible to find the target metadata resources by issuing a structure based query. For example, if the Resource Description Frame (RDF) format is used to represent a metadata graph, then a SPARQL query may be used to obtain the metadata resources. FIG. 3 shows an exemplary metadata graph. With respect to the metadata graph, if a Service that uses the ComplexTypeDefinition D and is classified by the BusinessTerm T is to be found, then the following SPARQL query may be constructed and issued:

Select ?x where {?x implement ?y. ?y interfaceOperation ?z. ?z interfaceMessageReference ?w. ?w use ?v. ?v name D. ?u classify ?x. ?u name T}

Such query-based search method has the disadvantage that the user needs to know and designate an accurate path from one metadata resource to another. Since users of the search engines generally have no clear idea of the structure of the data they intend to find, it is difficult for them to construct such a query.

SUMMARY OF THE INVENTION

The present invention provides a solution for accomplishing metadata search, which not only can return useful metadata resources related to the structure of the metadata, but also does not require the user to know and designate accurate paths among the metadata resources.

According to an aspect of the present invention, a system for realizing metadata search includes: a receiving module configured for receiving a search query with respect to a plurality of metadata resources, the search query designating textual information in metadata resources without designating all the structural information among metadata resources; a query module configured for parsing the search query and for searching related metadata resources and the structural information among the related metadata resources according to the parsing of the search query to form search results, the search results including the complete structural information among the related metadata resources; and an output module configured for outputting the search results so as to realize a fuzzy structural search with respect to the plurality of metadata resources.

According to another aspect of the present invention, a method for realizing metadata searches is provided, including the steps of: receiving a search query with respect to a plurality of metadata resources, wherein the search query does not designate all the textual information in metadata resources; parsing the search query; searching related metadata resources and the structural information among the related metadata resources according to the parsing of the search query so as to form search results, wherein the search results include the complete structural information among the metadata resources; and outputting the search results so as to realize a fuzzy structural search to the plurality of metadata resources.

According to a further aspect of the present invention, a computer readable article of manufacture tangibly embodies computer executable instructions that will cause a computer to perform the steps of the above method.

The present invention can realize the keyword-based search and the fuzzy structural search with respect to metadata resources at the same time. In this way, not only the textual information in the metadata resources can be searched, the structural information in the metadata resources can be obtained as well, thereby providing the user with more useful and more relevant information; and at the same time, since it is not necessary for the user to know and designate the accurate structure in the metadata, the user can perform the search operation more conveniently.

BRIEF DESCRIPTION OF THE DRAWINGS

The present invention and its preferred embodiments, objectives, features and advantages will be understood by referring to the following detailed descriptions of the exemplary embodiments when read in conjunction with the accompanying drawings, in which:

FIG. 2 shows an exemplary HTML page for a metadata resource BusinessTerm AddressNumber;

DETAILED DESCRIPTION OF PREFERRED EMBODIMENTS

According to an embodiment of the present invention, a new system and method for realizing metadata search is provided. The system uses both textual and structural information in the metadata to perform a search query, and sorts the search results. In brief, the contributions of the system of the present invention include the following aspects.

First, new search types are provided. The new search types enable both a keyword search and fuzzy structural search with respect to metadata to be performed. Type information in the metadata can be obtained as well. In order to reduce the burden of the end user constructing and issuing a search query, simple query syntax is used, making it unnecessary for the user to know or specify the structural information like the accurate relationship paths among the metadata. The fuzzy structural search refers to that in the search query, accurate or complete relationship paths among metadata resources are not designated. For example, no relationship path information among the metadata resources is indicated, or only incomplete or inaccurate relationship information among the metadata resources is provided; while the search results include complete or accurate relationship path information among the metadata resources.

Second, the structural information is shown to the user in the search results. Considering the importance of the structural information of metadata, in addition to displaying the text segments of the metadata resources satisfying the query, the relationships among the involved metadata resources are provided as well. In this way, the user can determine quickly whether the returned metadata resources are indeed relevant. Additionally, a new measurement for sorting the search results is further provided, and the new sorting measurement integrates both the text search factor and structure-related factor.

Finally, an index structure for realizing the above new types of search is provided. The index structure stores the textual information in the metadata resources, as well as information on the relationship paths among the metadata resources so as to enable navigating among different metadata resources.

Figure 4:
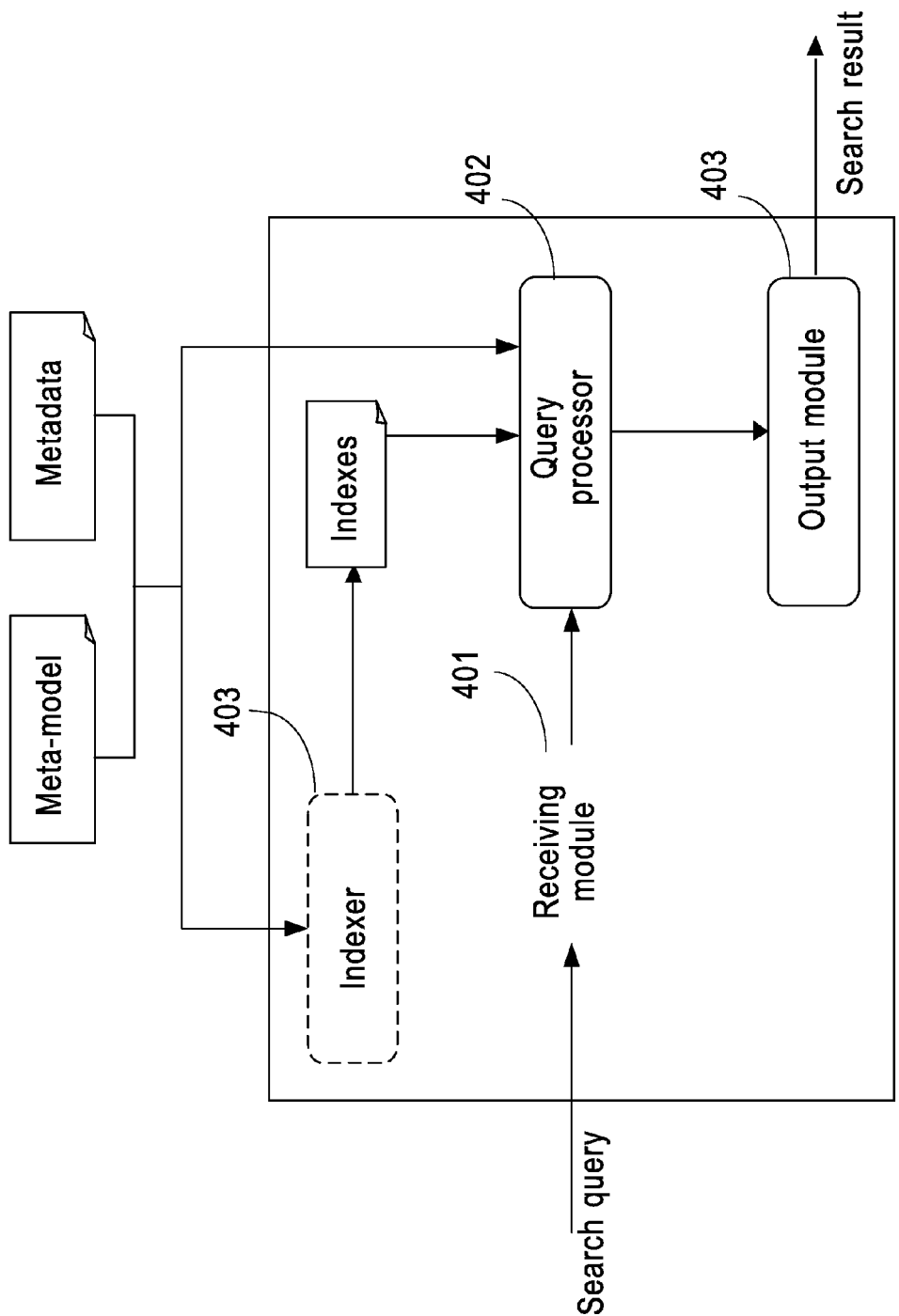
FIG. 4 shows a system for realizing metadata search according to an embodiment of the present invention.

FIG. 4 shows a system for realizing metadata search according to an embodiment of the present invention. As shown, the system includes: a receiving module 401 for receiving a search query with respect to a plurality of metadata resources, wherein the search query designates textual information in metadata resource, without designating structural information among metadata resources, or only designating partial structural information among metadata resources; a query module 402 for parsing the search query and searching the related metadata resources and the structural information among the related metadata resources according to the parsing of the search query, so as to form search results, wherein the search results include the complete structural information among the related metadata resources; and an output module 403 for outputting the search results so as to realize a fuzzy structural search with respect to the plurality of metadata resources.

According to an embodiment of the present invention, keywords are designated in the search query, and the query module 402 can receive and process the search query to obtain the metadata resources containing the designated keywords (and possibly text segments of the metadata resources including the designated keywords and the attributes to which the text segments belong in the metadata resources), so as to realize the keyword-based search with respect to the plurality of metadata resources; in addition, the query module 402 can further receive and process the search query to obtain the metadata resources having direct or indirect relationships with the metadata resources containing the designated keywords, so as to realize the fuzzy structural search with respect to the plurality of metadata resources. Further, a relationship among the metadata resources may be designated in the search query, and the query module 402 can receive and process the search query to obtain the metadata resources containing the designated relationship among the metadata resources, so as to realize the fuzzy structural search with respect to the plurality of metadata resources.

According to a further embodiment of the present invention, the type of the search query can be one of the follow five types, that is, the system of the present invention can process the following five query types.

Query type one is for searching the directly related metadata resources, namely, the search query designates a group of keywords for searching the metadata resources of which the text segments contain the designated group of keywords.

An exemplary syntax of this query type can be ":K", wherein K is a group of keywords. Its corresponding semantic is: to return the metadata resources of which the text segments contain the designated group of keywords K. A text segment refers to the value of some attribute of a metadata resource, and the attribute can be, e.g., a label, name, or annotation, and the like.

Figure 5A:
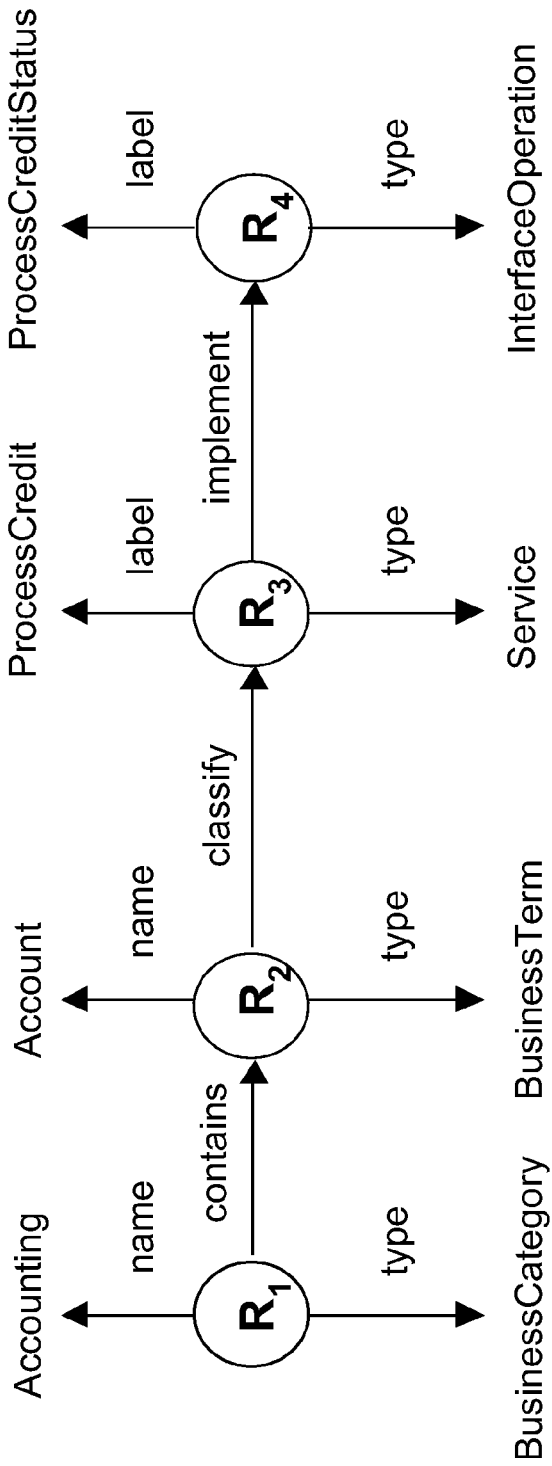
FIG. 5A shows a group of exemplary metadata resources and semantic relationships among the metadata resources.

For example, FIG. 5A shows a group of exemplary metadata resources and the semantic relationships among the metadata resources, wherein the name of the metadata resource $R_1$ is Accounting, and its type is BusinessCategory; the name of the metadata resource $R_2$ is Account, and its type is Business Term; the label of the metadata resource $R_3$ is ProcessCredit, and its type is Service; the label of the metadata resource $R_4$ is ProcessCreditStatus, and its type is InterfaceOperation. The relationships among the metadata resources are that $R_1$ contain $R_2$, $R_2$ classify $R_3$, and $R_3$ implement $R_4$. With respect to the group of exemplary metadata resources, if the inputted search query is ":credit", the outputted search results is "$R_3$, $R_4$", because the values of the respective attributes label of $R_3$ and $R_4$, ProcessCreidt and ProcessCreditStatus, contain the keyword credit designated in the search query, respectively.

Query type two is for searching the indirectly related metadata resources, that is, the search query designates a group of keywords for searching the metadata resources that have relationship paths to the metadata resources of which the text segments contain the designated group of keywords.

An exemplary syntax of the query type can be "K", wherein K is a group of keywords. Its corresponding semantic is: to return the metadata resources that have relationship paths to the metadata resources of which the text segments contain the designated group of keywords.

For example, with respect to the group of exemplary metadata resources shown in FIG. 5A, if the inputted search query is "credit", then the outputted search results are $R_1$, $R_2$, $R_3$ and $R_4$, wherein $R_3$ and $R_4$ are returned because the values of their respective attributes label, ProcessCredit and ProcessCreditStatus, contain the keyword credit, which is designated in the search query, while $R_2$ is returned because $R_2$ has a relationship path to the metadata resource $R_3$, $R_2$ classify $R_3$, or has a relationship path to $R_4$, $R_2$ classify $R_3$ implements $R_4$, and $R_1$ is returned because $R_1$ has a relationship path to the metadata resource $R_3$, $R_1$ contain $R_2$ classify $R_3$, or has a relationship path to $R_4$, $R_1$ contain $R_2$ classify $R_3$ implement $R_4$.

According to a further embodiment of the present invention, the query type two is used to search the following several kinds of metadata resources: metadata resources S of which the text segments contain the designated group of keywords, metadata resources S' that has direct relationship paths to any one of the metadata resources in S, and metadata resources having relationship paths which include an equivalence or containment relationship to any one of the metadata resources in S'. The equivalence relationship refers to that metadata resources have a semantically identical or similar relationship.

Figure 5B:
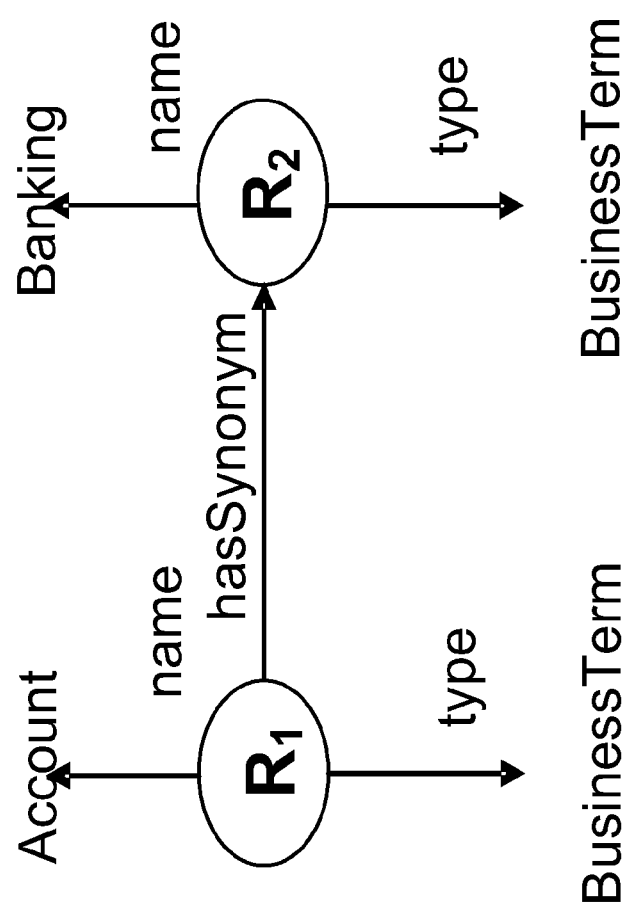
FIG. 5B shows an example of metadata resources having an equivalent relationship.

FIG. 5B shows an example of metadata resources having equivalence relationships. As shown, the metadata resource $R_1$ of which the type is BusinessTerm and the name is Account and the metadata resource $R_2$ of which the type is BusinessTerm and the name is Banking have a hasSynonym relationship, which is an equivalence relationship. Therefore, the metadata resources $R_1$ and $R_2$ have an equivalence relationship. As such, when the user uses the keyword "banking" to search, $R_2$ is retuned as a result, and at the same time $R_1$ is also returned as a result, because $R_1$ has an equivalence relationship with $R_2$. Containment relationship refers to the semantic containment relationship among metadata resources; for example, the relationship between the metadata resource $R_1$ of which the type is BusinessCategory and the name is Accounting and the metadata resource $R_2$ of which the type is BusinessTerm and the name is Account in FIG. 5A is the containment relationship. As such, when the user uses the keyword "account" to perform the search, $R_2$ is retuned as a result, and at the same time $R_1$ is also returned as a result, because $R_1$ has a containment relationship with $R_2$.

Query type three is for searching the metadata resources directly related and having a type constraint, that is, the search query designates a group of keywords and a metadata resource type for searching the metadata resources of which the text segments include the designated group of keywords and the type is the designated type.

An exemplary syntax of the query type can be "T:K", wherein K is a group of keywords and T is the type of the metadata resources. Its corresponding semantic is: returning the metadata resources of which the text segments include the designated group of keywords K and the type is the designated type T.

For example, with respect to the group of the exemplary metadata resources shown in FIG. 5A, if the inputted search query is "BusinessTerm: credit", then the returned search result is null. This is because there is no metadata resource of which the text segments include the keyword credit and the type is BusinessTerm.

Query type four is for searching the metadata resources indirectly related and having a type constraint, that is, the search query designates a group of keywords and a metadata resource type for searching the metadata resources of which the type is the designated type and having relationship paths to the metadata resources of which the text segments include the designated group of keywords.

An exemplary syntax of the query type can be "T K", wherein K is a group of keywords and T is a type of metadata resources. The corresponding semantic is: returning the metadata resources of which the type is the designated type K and having relationship paths to the metadata resources of which the text segments include the designated group of keywords K.

For example, with respect to the group of exemplary metadata resources shown in FIG. 5A, if the inputted search query is "BusinessTerm Credit", then the returned result is $R_2$, because the type of the metadata resource $R_2$ is BusinessTerm, and at the same time $R_2$ has a relationship path to $R_3$, $R_2$ classify $R_3$, while the text segments of the attribute label of $R_3$ include the keyword credit.

According to another embodiment of the present invention, the search query four is for searching the following several types of metadata resources: the metadata resources S of which the type is the designated type and the text segments include the designated group of keywords, the metadata resources S' of which the type is the designated type and having direct relationship paths to any one of the metadata resources in S, and the metadata resources of which the type is the designated type and having relationship paths which include the equivalence or containment relationship to any one of the metadata resources in S'.

Query type five is for searching the related metadata resources having some relationship, that is, the search query designate a first group of keywords, a second group of keywords and a relationship, to obtain first metadata resources, the first metadata resources having relationship paths including the designated relationship to second metadata resources, the first metadata resources containing the first group of keywords or having relationship paths to the metadata resources containing the first group of keywords, and the second metadata resource containing the second group of keywords or having relationship paths to the metadata resources containing the second group of keywords.

An exemplary syntax of the query type can be "A R A", wherein A=:K|K|T:K|TK, A'=:K'|K'|T':K'|T'K', K and K' each are a group of keywords, T and T' each are a type of metadata resources, and R is a relationship between metadata resources. The corresponding semantic is: returning the metadata resources designated by A, the metadata resources having relationship paths to the metadata resources designated by A', and the relationship paths including the designated relationship R, wherein A and A' designate the metadata resources in the manner of the foregoing query types one, two, three and four.

For example, with respect to the group of the exemplary metadata resources shown in FIG. 5A, if the inputted search query is "Service:credit implement InterfaceOperation: credit", then the returned search results are $R_3$. This is because the type of the metadata resource $R_3$ is the designated Service, the text segment of its attribute label includes the designated credit, the type of the metadata resource $R_4$ is the designated type InterfaceOperation, the text segment of its attribute label includes the designated credit, $R_3$ has a path to $R_4$, that is, $R_3$ implements $R_4$, and the path includes the designated relationship, implement.

The above is shown the five query types that can be supported by the system according to an embodiment of the present invention. It should be pointed out that in other embodiments of the present invention, the system can also support only part of the five query types, e.g., only one or more of the query types two, four and five, and zero, one or two of the query types one and three.

Returning back to FIG. 4, according to an embodiment of the present invention, the output module 403 is further used to display the search results, the search result including the metadata resources or part thereof returned in response to the search query (for example, the text segments including the keywords designated in the search query, or some text segments in the metadata resources having relationship paths to the metadata resources including the keywords designated in the search query) and/or a link to the metadata resources, and the relationship paths between the metadata resources returned in response to the search query and the metadata resources including the keywords designated in the search query, or a link displaying the relationship paths when being clicked. The information on the relationship paths can inform the user why the specific metadata resources are returned as the results, so as to enable the user to determine quickly whether the specific metadata resources are that user desired.

Figure 6:
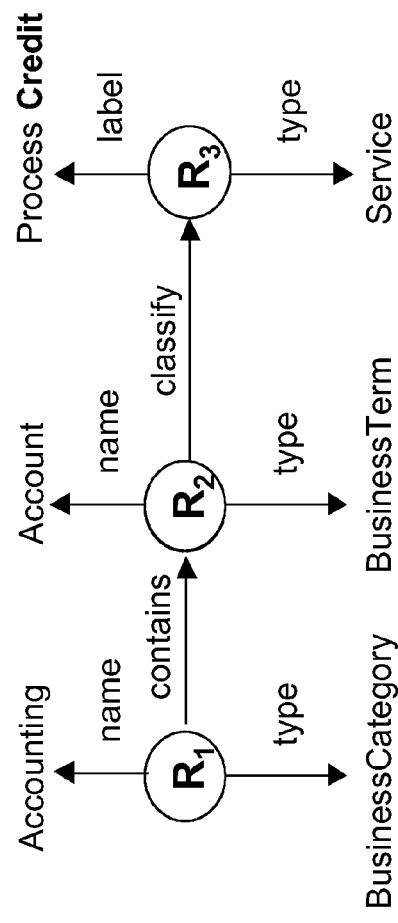
FIG. 6 shows an example of the search result returned in response to an inputted keyword credit.

FIG. 6 shows an example of the search results returned in response to the keyword credit, wherein Accounting|Metadata Web WBGRepository is the name of the metadata resource and the repository where it is located, http://wbg.dyn.webahead.abc.com/resouce/2008/wbg/category/Accounting is the network address of the metadata resource, and Relationship is the link to the relationship path information. Clicking the link will display the relationship path information shown in the lower part of the figure, in which is displayed the relationship path from the returned metadata resources $R_1$ with the name of Accounting to the metadata resource $R_3$ of which the text segment of the attribute label includes the keyword designated in the search query.

According to an embodiment of the present invention, the output module 403 included in the system further can be optionally configured to sort the metadata resources returned in response to the search query in the search results, and the sorting is performed according to a measurement based on keyword matching and a measurement based on the paths between the obtained metadata resources and the metadata resources containing the keywords designated in the search query. That is to say, the sorting of the plurality of the metadata resources returned in the search results integrates both the text match measurement and the structure match measurement. In respect of the text match measurement, the measurement based on keyword matching provided in a current web search engine can be used. In respect of the structure matching measurement, the following hypothesis can be used: two metadata resources connected by a shorter path are more related with each other than two metadata resources connected by a longer path. Therefore, as an example, the sorting can be performed according to the formula $$m = \alpha m_t + \beta |n|$$

where $m_t$ is calculated by the keyword-based match; $|n|$ is the number of steps in the path from the metadata resources returned as the search results to the metadata resources of which the text segments include the keywords designated in the search query; $\alpha$ and $\beta$ are two coefficients for adjusting the weights of the two measurements. In this way, the sorted search results can reflect not only the text match degree between the metadata resources returned as the search results and the keywords designated in the search query, but also the structure match degree between the metadata resources returned as the search result and the keywords designated in the search query, and hence can provide more useful and more relevant information to the user.

Returning to FIG. 4, according to an embodiment of the present invention, the system can further include an optional indexer module 403 for indexing the plurality of metadata resources to generate text indexes on the texts in the plurality of metadata resources and structure indexes storing the relationship path information between pairs of metadata resources in the plurality of metadata resources; and wherein, the query module 402 further can be optionally configured to process the search query by using the text indexes and the structure indexes and to generate the search result. Of course, in some other embodiments of the present invention, the system can be without the indexer module 403, and the query module 402 can process the search query by directly searching the metadata resources and generate the search results.

Figure 1:
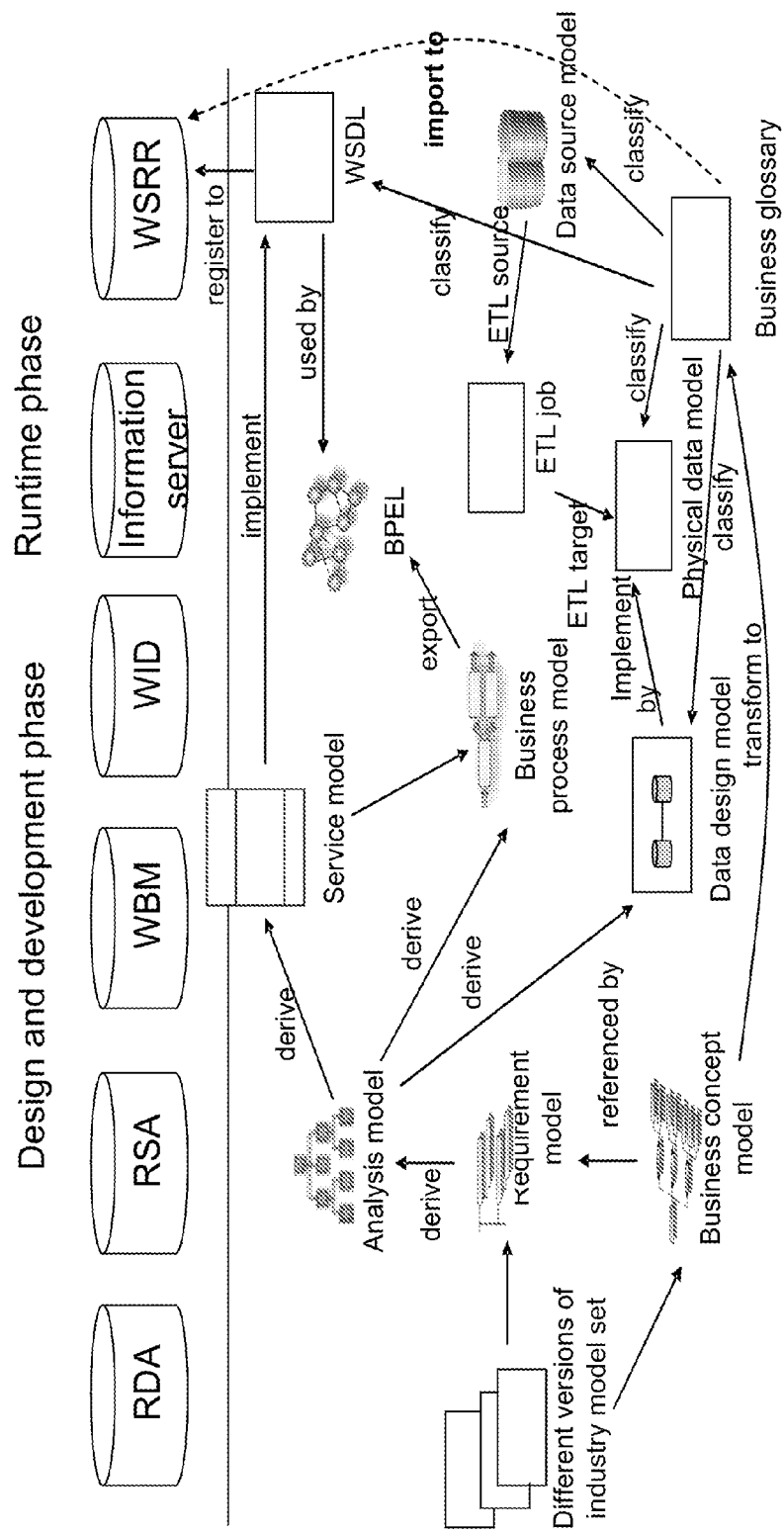
FIG. 1 schematically shows various metadata resources and their complex relationships in an exemplary enterprise scenario including a design and development phase and a runtime phase.
Figure 3:
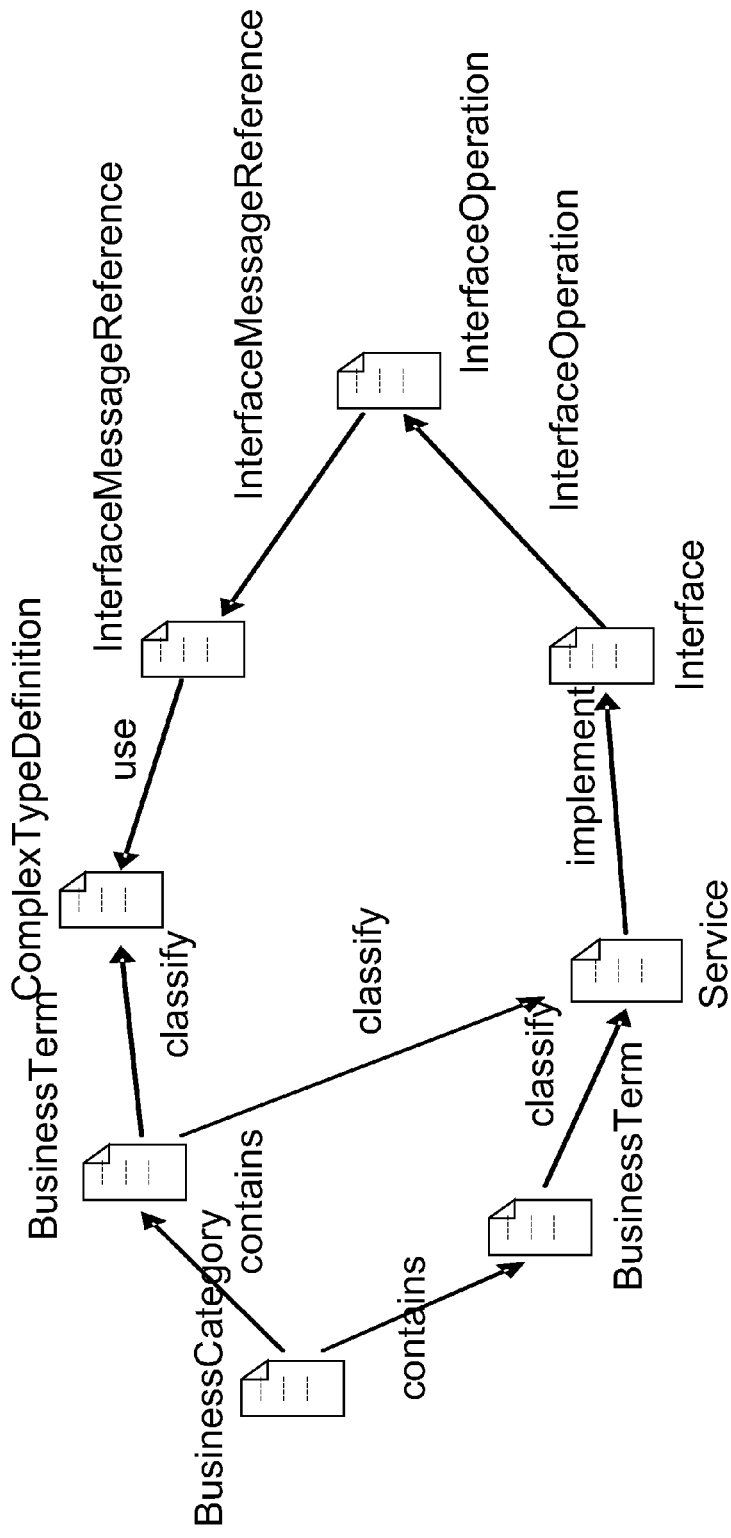
FIG. 3 shows an exemplary metadata graph.

The indexer module 403 can use the metadata resources and the meta-model to which the metadata resources conform to generate the text indexes and the structure indexes about the metadata resources. The meta-model can be any meta-model known in the art adopted by the repository where the metadata resources are located. Only as an example, the indexer module 403 can first use the metadata resources and the meta-model to generate a metadata graph reflecting the metadata resources and the relationships among them (as shown exemplarily in FIG. 3), and generate the text indexes and the structure indexes through the metadata graph. The metadata graph can be, e.g., in an RDF format. It is well known in the art how to use metadata resources and a meta-model to generate a metadata graph. Of course, the indexer module 403 can also generate the text indexes and the structure indexes directly from the metadata resources and the meta-model.

According to a further embodiment of the present invention, the text indexes store the mapping between the text segments or part thereof in the plurality of metadata resources, and the corresponding metadata resources as well as the attributes to which the text segments belong in the corresponding metadata resources. According to a still further embodment of the present invention, the text indexes further store the type information of the metadata resources.

In order to generate the text indexes, first the text segments in each of the metadata resources can be identified. Then a classical inverted index structure used in Information Retrieval (IR) can be used to construct the text indexes. Lucene is a famous IR-based index engine based on the concept of documents, fields (e.g., title, text, etc.) and terms. Only as an example, the indexer module 403 in the system of the present invention can use Lucene to generate the text indexes. As such, the metadata resources can be viewed as documents; the attribute to which the text segments belong, such as longDesciption of BusinessTerm, label of Service, etc., can be viewed as fields; and the values the attributes, that is, the text segments per se, can be viewed as terms. In addition, the types of the metadata resources can also be viewed as fields to store the type information of the metadata resources in the text indexes. Of course, the foregoing concrete method for generating the text indexes of the metadata resources is only an illustration, in stead of limitation to the present invention. The indexer module 403 in the system of the present invention can use any method known in the art or to be developed in the further to generate the text indexes of the metadata resources.

Figure 7:
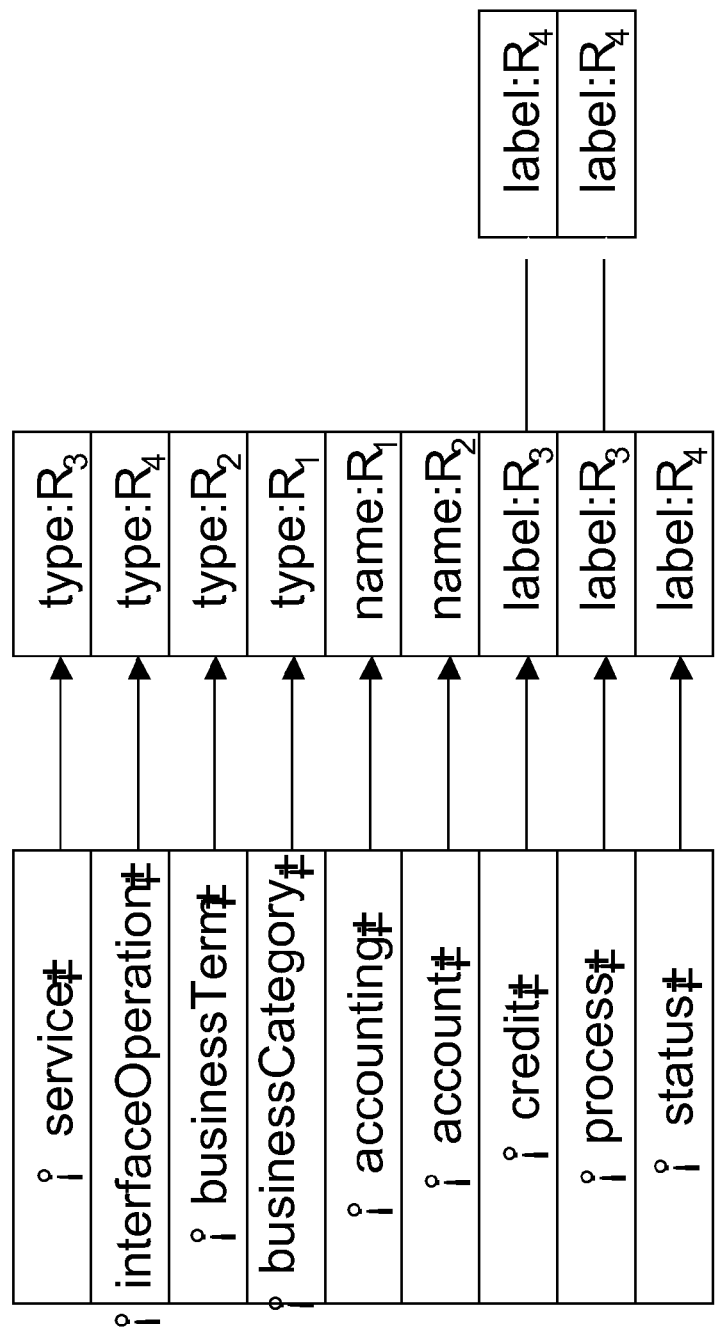
FIG. 7 shows an example of text indexes generated based on the exemplary metadata resources shown in FIG. 5A according to an embodiment of the present invention.

FIG. 7 shows an example of the text indexes that the indexer module 403 in the system of the present invention generates according to the exemplary metadata resources shown in FIG. 5A. As shown, the text indexes store the keywords in the text segments of the metadata resources, for example, "accounting", "account", "credit", etc., the mapping between the keywords and the corresponding metadata resources $R_1$, $R_2$, $R_3$ and the corresponding attributes name, label, etc., and further store the type information like "service", "interfaceOperation" of the metadata resources $R_3$, $R_4$, etc.

A type can be viewed as an attribute, that is, type attribute. As such, using the text indexes, the metadata resources $R_3$, $R_4$ including the keyword such as "credit", etc., and their corresponding attributes such as label, etc. can be found conveniently through the keyword in the inputted search query. As shown in the figure, the text indexes can store either the whole text segment of an attribute as the keywords, for example, "service", "interfaceOperation", "businessTerm", "businessCategory", "accounting" and "account", or part of the text segment of the attribute as the keywords, for example, "credit", "process" and "status". Therefore, optionally, before the text segments of the metadata resources or the keywords therein are stored into the text indexes, any known word division method in the art can be used first to divide the text segments into parts as the keywords.

According to an embodiment of the present invention, the structure indexes are implemented by a two-level hash table, with entries in the first level hash table being identifiers of the metadata recourses as the end nodes of relationship paths and entries in the second level hash table being identifiers of the metadata recourses as the start nodes of the relationship paths and information on the relationship paths. For example, for a given relationship path $r_1 p_1 r_2 p_2 \ldots r_n$, wherein $r_i$ represents a metadata resource, $p_j$ represents the relationship between metadata resources, $i=1 \ldots n$, $j=1 \ldots n-1$, and $r_n$ is stored in the first level hash table, while $r_1$ is stored in the entry corresponding to $r_n$, of the second level hash table, and the relationship path $r_1 p_1 r_2 p_2 \ldots r_n$ is stored in the entry of $r_1$.

Figure 8:
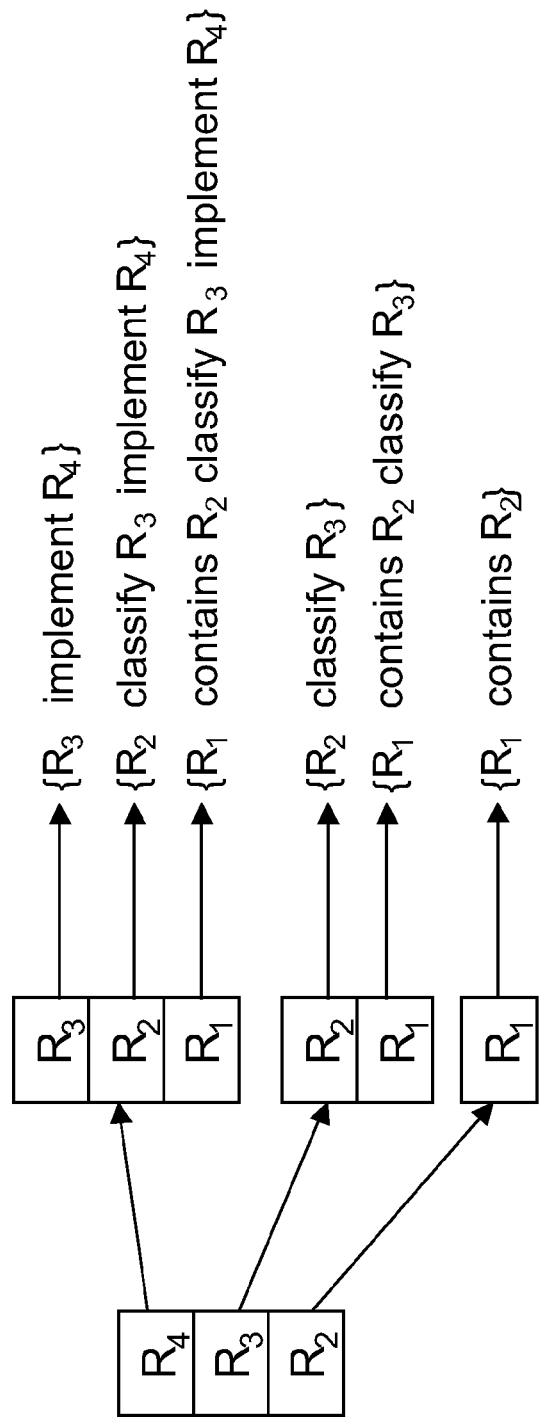
FIG. 8 shows an example of structure indexes generated based on the exemplary metadata resources shown in FIG. 5A according to an embodiment of the present invention.

According to an embodiment of the present invention, in the structure indexes are stored paths between any pair of metadata resources in a group of metadata resources, including all the direct paths and indirect paths. FIG. 8 shows an example of the structure indexes generated based on the exemplary metadata resources shown in FIG. 5A according to an embodiment of the present invention. As shown, according to the structure indexes, all the relationship paths to any one of the metadata resources such as $R_4$, for example, $R_3$ implement $R_4$, $R_2$ classify $R_3$ implement $R_4$, $R_1$ contain $R_2$ classify $R_3$ implement $R_4$, can be acquired easily.

In order to reduce the number of relationship paths stored in the structure indexes and keep only the most relevant relationship paths, according to a further embodiment of the present invention, the relationship paths stored in the structure indexes include the following three types.

Direct relationship paths between pairs of metadata resources: A direct relationship path indicates that the metadata resources as the start node and the end node of the direct relationship path have a direct relationship between them. Such direct relationship paths can be obtained from the metadata graph directly, since they are edges of the metadata graph.

Relationship paths including an equivalence relationship between pairs of metadata resources: Such a path indicates a group of equivalence metadata resources and is transitive, for example, the equivalence relationship among a group of metadata resources of which the type is businessTerm and having hasSynonsym. Only as an example, the user can indicate the equivalence relationship by providing annotations on the level of meta-model; for example, in the meta-model of the WebSphere Business Glossary repository, the user can indicate that the attribute hasSynonym represents the equivalence relationship. As such, the indexer module 403 will index all the paths having the attribute hasSynnonym.

Relationship paths including a containment relationship between pairs of metadata resources: Such a relationship path indicates a containment relationship among metadata resources and is transitive. For example, a metadata resource of type businessCategory contains a metadata resource of type businessTerm. Considering that a meta-model is usually represented by an UML model, and the composition relationship and aggregation relationship in the UML model have the semantic of containment relationship, by default, these relationships can be extracted from the meta-model as the containment relationship. Additionally, the user can be allowed to customize the containment relationship on the meta-model level.

Figure 9:
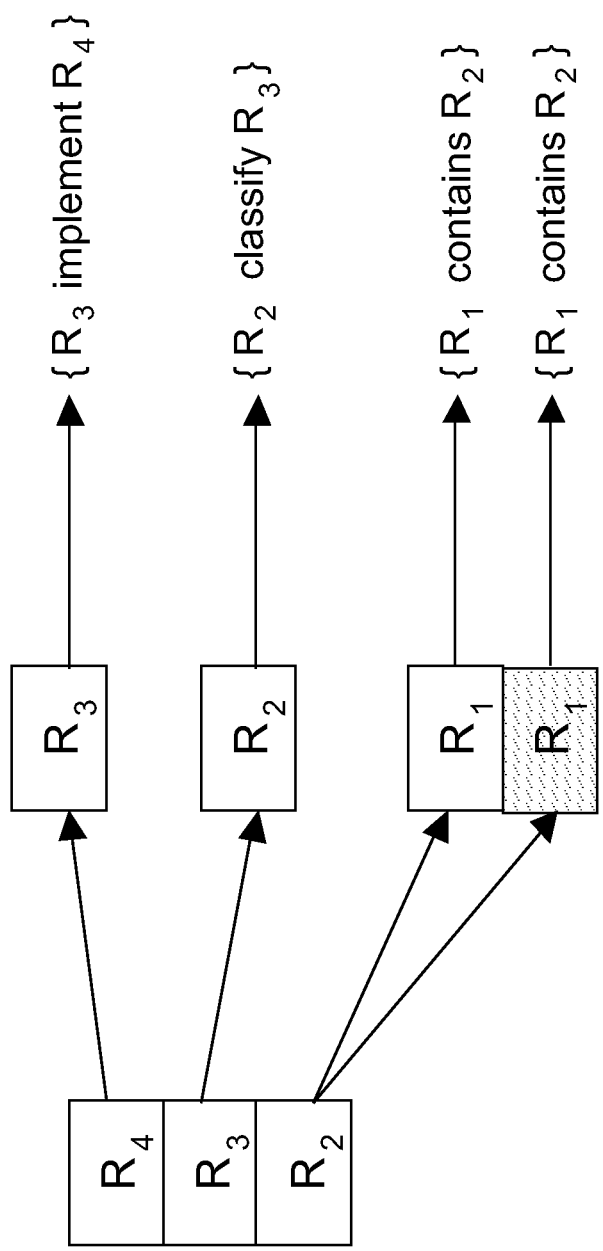
FIG. 9 shows an example of structure indexes generated based on the exemplary metadata resources shown in FIG. 5A according to another embodiment of the present invention.

FIG. 9 shows an example of the structure indexes generated based on the exemplary metadata resources shown in FIG. 5A according to the other embodiment of the present invention. As shown in the figure, in the structure indexes are first stored the direct relationship paths, from $R_3$ to $R_4$, from $R_2$ to $R_3$, and from $R_1$ to $R_2$, which are obtained from the meta-model; and then is stored the containment relationship path from $R_1$ to $R_2$, represented in shadow in the figure, obtained according to the meta-model.

In the system of the present invention, the method in which the query module 402 uses the above index structure to process a search query can be as follows.

For query type one, for example, ":K", the text indexes are used to search the corresponding metadata resources through the keyword K.

For query type two, for example, "T: K", type information is used to further filter out the metadata resources that do not belong to the type T.

For query type three (according to the further embodiment of the present invention), for example, "K", first, through the keyword K, the text indexes are used to search the corresponding metadata resources, which are denoted as S. Second, for each entry in S, the structure indexes are used to find all the metadata resources related thereto directly, which are denoted as S'. Finally, for each entry in S', the structure indexes are used to search all the metadata resources having the equivalence or containment relationship.

With respect to the example of text indexes shown in FIG. 7 and the example of structure indexes shown in FIG. 9, if the issued search query is "credit", then the index results are $R_1$, $R_2$, $R_3$, $R_4$, wherein $R_3$ and $R_4$ are metadata resources containing the keyword credit directly, while $R_2$ has a direct relationship to $R_3$, and $R_1$ has an containment relationship to $R_2$.

For query type four, for example, "T K", the type information is further used to filter out the metadata resources that do not belong to the type T.

For query type five, first the text indexes or both the text indexes and the structure indexes are used to search the metadata resources represented by A and A'. Second, the structure indexes are used to filter out such metadata resources in the metadata resources represented by A, that the paths from the metadata resources to the metadata resources represented by A' do not include the relationship R.

The foregoing describes the system for realizing metadata search according to the embodiments of the present invention. It should be pointed out that the above is only an exemplary illustration, rather than limitation to the present invention. According to other embodiments of the present invention, the system can have more, fewer or different modules; the functions of each module or the relationships among the modules can be different from those described or shown; some modules may be divided into even smaller modules or combined into bigger ones; some functions of some modules can also be executed by other modules, and so on.

For example, in some embodiments of the present invention, the system can exclude one or more of the above optional modules. As another example, the query module 402 can further include a query parser for parsing the search query, and a search engine for searching metadata resources according to the parsing results of the query parser. As yet another example, the sorting function described above as performed by the output module 403 can also be performed by the query module 402.

In addition, the above described index structure according to the embodiments of the present invention is only exemplary, rather than limitation to the present invention. In the system according to other embodiments of the present invention, other index structures or other data structures can be used to realize the keyword-based search and the fuzzy structural search, etc. All these changes are within the scope of the present invention.

The following describes a method for realizing the metadata resources according to an embodiment of the present invention. The method can be executed by the system for realizing the metadata search according to an embodiment of the present invention, or can be executed by any other system or apparatus. For brevity, the following description omits some details that are redundant with the above described contents. Therefore, reference can be made to the above description to obtain more detailed understanding of the method for realizing the metadata search according to an embodiment of the present invention.

Figure 10:
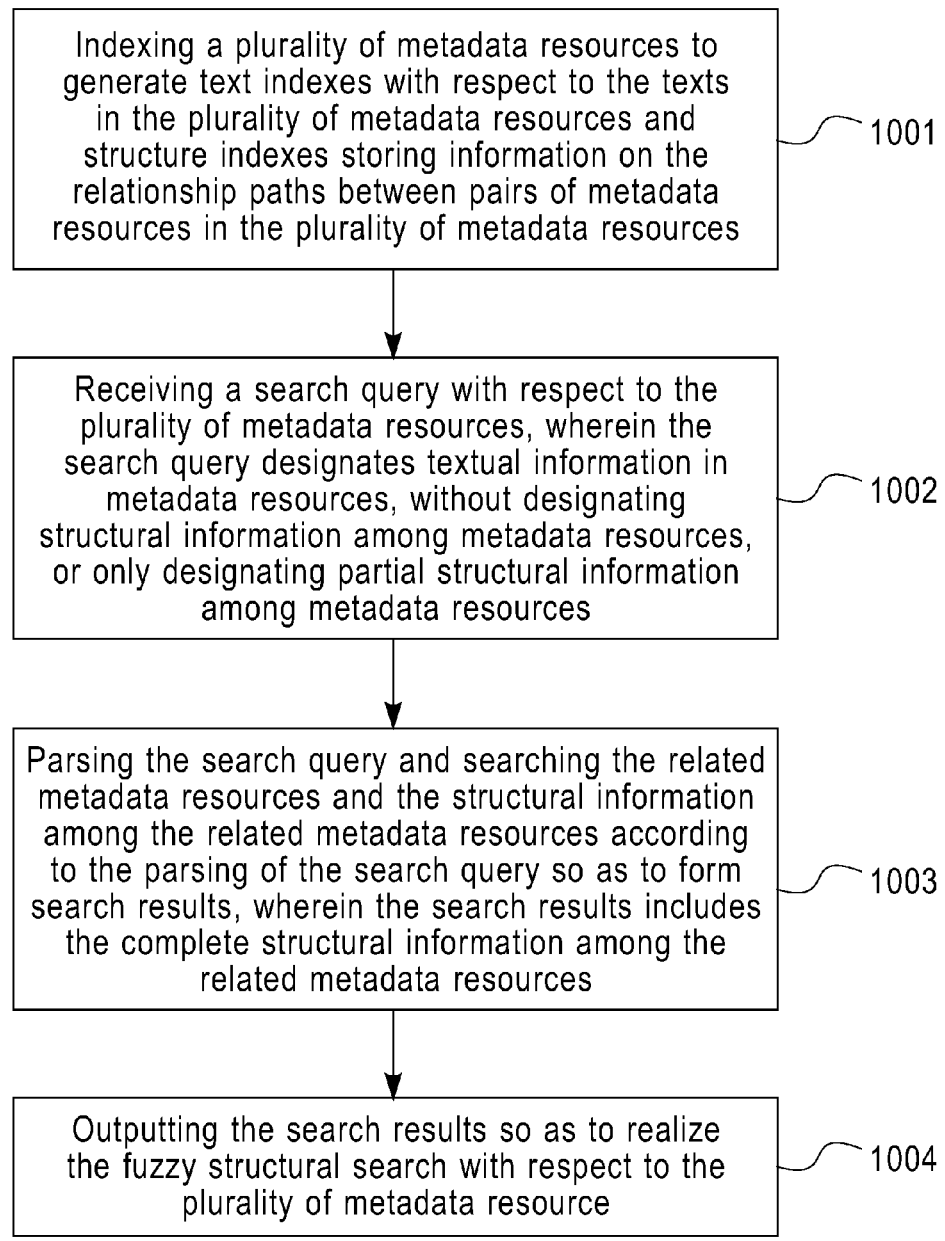
FIG. 10 shows a method for realizing metadata a search according to an embodiment of the present invention.

FIG. 10 shows a method for realizing metadata search according to an embodiment of the present invention. As shown, the method includes the following steps.

In step 1002, a search query with respect to a plurality of metadata resources is received, wherein the search query designates textual information in metadata resources, without designating structural information among metadata resources, or only designating partial structural information among metadata resources.

In step 1003, the search query is parsed, and the related metadata resources and the structural information among the related metadata resources are searched according to the parsing of the search query, so as to form the search results, wherein the search results include the complete structural information among the related metadata resources.

In step 1004, the search results are outputted so as to realize fuzzy structural search with respect to the plurality of metadata resources.

According to an embodiment of the present invention, the method further includes an optional step 1001, in which the plurality of metadata resources are indexed to generate text indexes of the text in the plurality of metadata resources and structure indexes storing the information on the relationship paths between pairs of metadata resources in the plurality of metadata resources; and wherein, the searching based on the parsing of the search query so as to form the search results is executed by using the text indexes and the structure indexes.

According to an embodiment of the present invention, the text indexes store the mapping between the text segments in the plurality of metadata resources and the corresponding metadata resources as well as the attributes to which the text segments belong in the corresponding metadata resources, and also store the type information of the metadata resources.

According to an embodiment of the present invention, the text indexes are implemented by a two-level hash table, with entries in the first level hash table being the identifiers of the metadata resources as the end nodes of the relationship paths and entries in the second level hash table being the identifiers of the metadata resources as the start nodes of the relationship paths and information on the relationship paths.

According to an embodiment of the present invention, the relationship paths include: direct relationship paths between pairs of metadata resources; relationship paths including an equivalence relationship between pairs of metadata resources; and relationship paths including a containment relationship between pairs of metadata resources.

According to an embodiment of the present invention, the type of search query is one of the group including at least one of the following types:

query type one, wherein the search query designates a group of keywords to obtain the metadata resources of which the text segments include the designated group of keywords;

query type two, wherein the search query designates a group of keywords to obtain the metadata resources which have relationship paths to the metadata resources of which the text segments include the designated group of keywords;

query type three, wherein the search query designates a group of keywords and the type of metadata resources, to obtain the metadata resources of which the text segments include the designated group of keywords and the type of which is the designated type;

query type four, wherein the search query designates a group of keywords and the type of metadata resources to obtain the metadata resource of which the type is the designated type and having relationship paths to the metadata resources of which the text segments include the designated group of keywords; and query type five, wherein the search query designates a first group of keywords, a second group of keywords and a relationship to obtain a first metadata resources, the first metadata resources having relationship paths to a second metadata resources and the relationship paths including the designated relationship, the first metadata resources containing the first group of keywords or having relationship paths to the metadata resources containing the first group of keywords, the second metadata resources containing the second group of keywords or having relationship paths to the metadata resources containing the second group of keywords.

According to an embodiment of the present invention, in step 1004, optionally, the metadata resources obtained in response to the search query in the search results can further be sorted, and the sorting is performed according to a measurement based on keyword matching and a measurement based on the paths between the obtained metadata resources and the metadata resources containing the keywords designated in the search query.

According to an embodiment of the present invention, in step 1004, optionally, the search results can further be displayed, including the metadata resources obtained in response to the search query or part thereof and/or a link to the metadata resources, and the relationship paths between the metadata resources obtained in response to the search query and the metadata resources containing the keywords designated in the search query or a link to display the relationship paths when clicked.

The foregoing describes a method for realizing the metadata resources according to an embodiment of the present invention. It should be pointed out that the above description is only exemplary illustration, rather than limitation to the present invention. For example, in some of the embodiments of the present invention, the method may not include one or more of the above optional steps.

The present invention can be implemented in hardware, software, or a combination thereof. The present invention can be implemented in a single computer system in a centralized manner, or in a distributed manner, in which, different components are distributed in some interconnected computer systems. Any computer system or other apparatuses suitable for executing the method described in the text are appropriate. A typical combination of hardware and software can be a general-purpose computer system with a computer program, which when being loaded and executed, controls the computer system to execute the method of the present invention and constitutes the apparatus of the present invention.

The present invention can also be embodied in a computer program product, which includes all the features enabling the realization of the method described herein and can execute the method when being loaded into a computer system.

Although the present invention has been shown and described with reference to the preferred embodiments, those skilled in the art will appreciate that various changes in form and details can be made without departing from the scope and spirit of the present invention.

We claim:

1. A system for metadata searching, the system comprising:
    a memory;
    a processor;
    a receiving module configured for receiving a search query with respect to a plurality of metadata resources, wherein each of the plurality of metadata resources comprises data describing a set of other data, and wherein each of the plurality of metadata resources comprises structural information comprising at least relationship path information between the metadata resource and at least one other of the plurality of metadata resources, wherein the search query comprises at least one keyword associated with textual information in each of the plurality of metadata resources without designating all structural information among the plurality of metadata resources;
    a query module configured for
        parsing the search query;
        identifying a set of related metadata resources within the plurality of metadata resources based on at least the relationship path information within the structural information of each of the plurality of metadata resources;
        searching, based on the parsing, each of the set of related metadata resources based on the textual information and the structural information of each of the set of related metadata resources; and
        forming, based on the searching, a set of search results comprising, the search results comprising at least one of the set of related metadata resources comprising textual information satisfying the at least one keyword, and complete structural information between the at least one of the set of related metadata resources and at least one other of the set of related metadata resources; and
    an output module configured for outputting the search results so as to realize a fuzzy structural search with respect to the plurality of metadata resources, the fuzzy structural search utilizing the search query, which is absent at least a designation of the relationship path information among the plurality of metadata resources, to obtain the set of search results, which comprises the complete structural information between the at least one of the set of related metadata resources and at least one of the set of related metadata resources.

2. The system according to claim 1, further comprising:
    an indexer module configured for indexing the plurality of metadata resources, wherein the indexing generates
        text indexes with respect to the textual information in the plurality of metadata resources, and
        structure indexes storing information on relationship paths between pairs of metadata resources in the plurality of metadata resources;
    wherein the searching is based on the text indexes and the structure indexes.

3. The system according to claim 2, wherein the text indexes store a mapping between at least a portion of one or more text segments in the plurality of metadata resources and each corresponding metadata resource in the plurality of metadata resources, and attributes to which the one or more text segments belong to within each corresponding metadata resource, wherein the text indexes further store type information of each of the plurality of metadata resources.

4. The system according to claim 2, wherein the structure indexes are implemented by a two-level hash table, wherein entries in a first level hash table are identifiers of metadata resources at end nodes of the relationship paths, and wherein entries in a second level hash table are identifiers of metadata resources at start nodes of the relationship paths and information on the relationship paths.

5. The system according to claim 2, wherein the relationship paths comprise:
   direct relationship paths between pairs of metadata resources;
   relationship paths including an equivalence relationship between pairs of metadata resources; and
   relationship paths including a containment relationship between pairs of metadata resources.

6. The system of claim 1, wherein a type of the search query is at least one of:
   a first query type designating a group of keywords to obtain metadata resources comprising text segments including the designated group of keywords;
   a second query type designating a group of keywords to obtain metadata resources that have relationship paths to metadata resources comprising text segments including the designated group of keywords;
   a third query type designating a group of keywords and a type of metadata resources, to obtain metadata resources comprising text segments including the designated group of keywords and that are of the designated;
   a fourth query type designating a group of keywords and a type of metadata resources to obtain metadata resources comprising the designated type and having relationship paths to metadata resources comprising text segments including the designated group of keywords; and
   a fifth query type designating a first group of keywords, a second group of keywords, and a relationship to obtain a first set of metadata resources, the first set of metadata resources having relationship paths to a second metadata resources and the relationship paths comprising the designated relationship, wherein the first set of metadata resources comprises at least one of the first group of keywords and relationship paths to metadata resources comprising the first group of keywords, and wherein the second set of metadata resources comprises at least one of the second group of keywords and relationship paths to metadata resources comprising the second group of keywords.

7. The system of claim 6, wherein a search query of the second query type searches
   metadata resources S of which the text segments include the designated group of keywords,
   metadata resources S' having direct relationship paths to any one of the metadata resources in S, and
   metadata resources having relationship paths comprising at least one of an equivalence relationship and a containment relationship to any one of the metadata resources in S'; and
wherein a search query of the fourth query type is for searching
   metadata resources S comprising a type that is the designated type and the text segments of which include the designated group of keywords,
   metadata resources S' comprising a type that is the designated type and having direct relationship paths to any one of the metadata resources in S, and
   metadata resources comprising a type that is the designated type and having relationship paths comprising at least one of an equivalence relationship and a containment relationship to any one of the metadata resources in S'.

8. The system of claim 1, wherein the output module is further configured for:
   displaying the search results, wherein the displaying comprises at least one of
   displaying at least a portion of the at least one of the set of related metadata resources comprising the textual information; and
   displaying a link to the at least one of the set of related metadata resources, and wherein the displaying further comprises at least one of
   displaying a set of relationship paths, based on the complete structural information, between the at least one of the set of related metadata resources and at least one of the set of related metadata resources; and
   displaying a selectable link configured to display the set of relationship paths when selected.

9. The system of claim 1, wherein the output module is further configured for:
   sorting the at least one of the set of related metadata resources and the at least one other of the set of related metadata resources, the sorting being performed according to a measurement based on keyword matching and a measurement of a set of relationship paths between the at least one of the set of related metadata resources and the at least one other of the set of related metadata resources.

10. A method implemented on an electronic data processing system for performing a metadata resources search, the method comprising:
   receiving a search query with respect to a plurality of metadata resources, wherein each of the plurality of metadata resources comprises data describing a set of other data, and wherein each of the plurality of metadata resources comprises structural information comprising at least relationship path information between the metadata resource and at least one other of the plurality of metadata resources, wherein the search query comprises at least one keyword associated with textual information in each of the plurality of metadata resources without designating all structural information among the plurality of metadata resources;
   parsing the search query;
   identifying a set of related metadata resources within the plurality of metadata resources based on at least the relationship path information within the structural information of each of the plurality of metadata resources;
   searching, based on the parsing, each of the set of related metadata resources based on the textual information and the structural information of each of the set of related metadata resources;
   forming, based on the searching, a set of search results comprising, the search results comprising at least one of the set of related metadata resources comprising textual information satisfying the at least one keyword, and complete structural information between the at least one of the set of related metadata resources and at least one other of the set of related metadata resources; and
   outputting the search results so as to realize a fuzzy structural search with respect to the plurality of metadata resources, the fuzzy structural search utilizing the search query, which is absent at least a designation of the relationship path information among the plurality of metadata resources, to obtain the set of search results, which comprises the complete structural information between the at least one of the set of related metadata resources and at least one of the set of related metadata resources.

11. The method of claim 10, further comprising:
   indexing the plurality of metadata resources, wherein the indexing generates
   text indexes with respect the textual information in the plurality of metadata resources, and structure indexes storing information on relationship paths between pairs of metadata resources in the plurality of metadata resources;

wherein the searching is based on the text indexes and the structure indexes.

12. The method of claim 11, wherein the text indexes store a mapping between at least a portion of one or more text segments in the plurality of metadata resources and each corresponding metadata resource in the plurality of metadata resources, and attributes to which the one or more text segments belong to within each corresponding metadata resource, wherein the text indexes further store type information of each of the plurality of metadata resources.

13. The method of claim 11, wherein the structure indexes are implemented by a two-level hash table, where entries in a first level hash table are the identifiers of metadata resources at end nodes of the relationship paths, and wherein entries in a second level hash table are the identifiers of metadata resources at start nodes of the relationship paths and information on the relationship paths.

14. The method of claim 11, wherein the relationship paths comprise:
direct relationship paths between pairs of metadata resources;
relationship paths including an equivalence relationship between pairs of metadata resources; and
relationship paths including a containment relationship between pairs of metadata resources.

15. The method of claim 10, wherein a type of the search query is at least one of:
a first query type designating a group of keywords to obtain metadata resources comprising text segments including the designated group of keywords;
a second query type designating a group of keywords to obtain metadata resources that have relationship paths to metadata resources comprising text segments including the designated group of keywords;
a third query type designating a group of keywords and a type of metadata resources, to obtain metadata resources comprising text segments including the designated group of keywords and that are of the designated;
a fourth query type designating a group of keywords and a type of metadata resources to obtain metadata resources comprising the designated type and having relationship paths to metadata resources comprising text segments including the designated group of keywords; and
a fifth query type designating a first group of keywords, a second group of keywords, and a relationship to obtain a first set of metadata resources, the first set of metadata resources having relationship paths to a second metadata resources and the relationship paths comprising the designated relationship, wherein the first set of metadata resources comprises at least one of the first group of keywords and relationship paths to metadata resources comprising the first group of keywords, and wherein the second set of metadata resources comprises at least one of the second group of keywords and relationship paths to metadata resources comprising the second group of keywords.

16. The method of claim 15, wherein a search query of the second query type searches
metadata resources S of which the text segments include the designated group of keywords,
metadata resources S' having direct relationship paths to any one of the metadata resources in S, and
metadata resources having relationship paths comprising at least one of an equivalence relationship and a containment relationship to any one of the metadata resources in S'; and wherein a search query of the fourth query type is for searching
metadata resources S comprising a type that is the designated type and the text segments of which include the designated group of keywords,
metadata resources S' comprising a type that is the designated type and having direct relationship paths to any one of the metadata resources in S, and
metadata resources comprising a type that is the designated type and having relationship paths comprising at least one of an equivalence relationship and a containment relationship to any one of the metadata resources in S'.

17. The method of claim 10, wherein the outputting comprises:
displaying the search results, wherein the displaying comprises at least one of
displaying at least a portion of the at least one of the set of related metadata resources comprising the textual information; and
displaying a link to the at least one of the set of related metadata resources, and wherein the displaying further comprises at least one of
displaying a set of relationship paths, based on the complete structural information, between the at least one of the set of related metadata resources and at least one of the set of related metadata resources; and
displaying a selectable link configured to display the set of relationship paths when selected.

18. The method of claim 10, wherein the outputting comprises:
sorting the at least one of the set of related metadata resources and the at least one other of the set of related metadata, the sorting being performed according to a measurement based on keyword matching and a measurement based on a set of relationship paths between the at least one of the set of related metadata resources and the at least one other of the set of related metadata resources.

19. A non-transitory computer program product embodying computer readable instructions which, when executed by a computer, cause it to carry out a method comprising:
receiving a search query with respect to a plurality of metadata resources, wherein each of the plurality of metadata resources comprises data describing a set of other data, and wherein each of the plurality of metadata resources comprises structural information comprising at least relationship path information between the metadata resource and at least one other of the plurality of metadata resources, wherein the search query comprises at least one keyword associated with textual information in each of the plurality of metadata resources without designating all structural information among the plurality of metadata resources;
parsing the search query;
identifying a set of related metadata resources within the plurality of metadata resources based on at least the relationship path information within the structural information of each of the plurality of metadata resources;
searching, based on the parsing, each of the set of related metadata resources based on the textual information and the structural information of each of the set of related metadata resources;

forming, based on the searching, a set of search results comprising, the search results comprising at least one of the set of related metadata resources comprising textual information satisfying the at least one keyword, and complete structural information between the at least one other of the set of related metadata resources and at least one of the set of related metadata resources; and outputting the search results so as to realize a fuzzy structural search with respect to the plurality of metadata resources, the fuzzy structural search utilizing the search query, which is absent at least a designation of the relationship path information among the plurality of metadata resources, to obtain the set of search results, which comprises the complete structural information between the at least one of the set of related metadata resources and at least one of the set of related metadata resources.

* * * * *